United States Patent
Ramalingam

(10) Patent No.: US 10,475,014 B1
(45) Date of Patent: Nov. 12, 2019

(54) PAYMENT DEVICE SECURITY

(71) Applicant: Amazon Technologies, Inc., Reno, NV (US)

(72) Inventor: Harsha Ramalingam, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 333 days.

(21) Appl. No.: 13/838,354

(22) Filed: Mar. 15, 2013

(51) Int. Cl.
*G06Q 20/20* (2012.01)
*G06Q 20/40* (2012.01)

(52) U.S. Cl.
CPC ........... *G06Q 20/206* (2013.01); *G06Q 20/40* (2013.01)

(58) Field of Classification Search
None
See application file for complete search history.

(56) References Cited

U.S. PATENT DOCUMENTS

| | | | |
|---|---|---|---|
| 5,321,751 A * | 6/1994 | Ray et al. | 713/186 |
| 2004/0015408 A1* | 1/2004 | Rauen et al. | 705/26 |
| 2008/0217398 A1 | 9/2008 | Woo | |
| 2012/0069131 A1* | 3/2012 | Abelow | 348/14.01 |
| 2012/0240195 A1* | 9/2012 | Weiss | 726/4 |
| 2012/0290421 A1* | 11/2012 | Qawami et al. | 705/21 |

* cited by examiner

*Primary Examiner* — Fateh M Obaid
(74) *Attorney, Agent, or Firm* — Lee & Hayes, P.C.

(57) ABSTRACT

This disclosure is directed, in part, to providing payment device security by storing security information in a payment device that, when received by a point-of-sale (POS) device, initiates a security request by the POS device that is used to protect the payment device against fraudulent use or misuse by unauthorized people. The payment device may store a code that, when received by the POS device, may allow the POS device to determine a security request associated with the code. The POS device may determine the security request by converting the code locally or the POS device may transit the code to a security provider that returns the security request. The POS device may then implement and/or enforce the security request. In some embodiments, the authorized user of the payment device may specify at least part of the security request, thereby enabling customization the security request.

32 Claims, 7 Drawing Sheets

PAYMENT DEVICE SECURITY

BACKGROUND

Credit cards and other payment instruments are often stolen by unscrupulous people. These people then try to make payments using the actual payment instrument or copies of the payment instrument, which may be physical copies or digital copies. Some payment instruments require use of a personal identification number (PIN) to thwart misuse or fraudulent use of the payment instruments. However, a PIN only provides minimal protection against fraudulent use because the payment instrument may still be used by anyone that discovers or knows the PIN.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
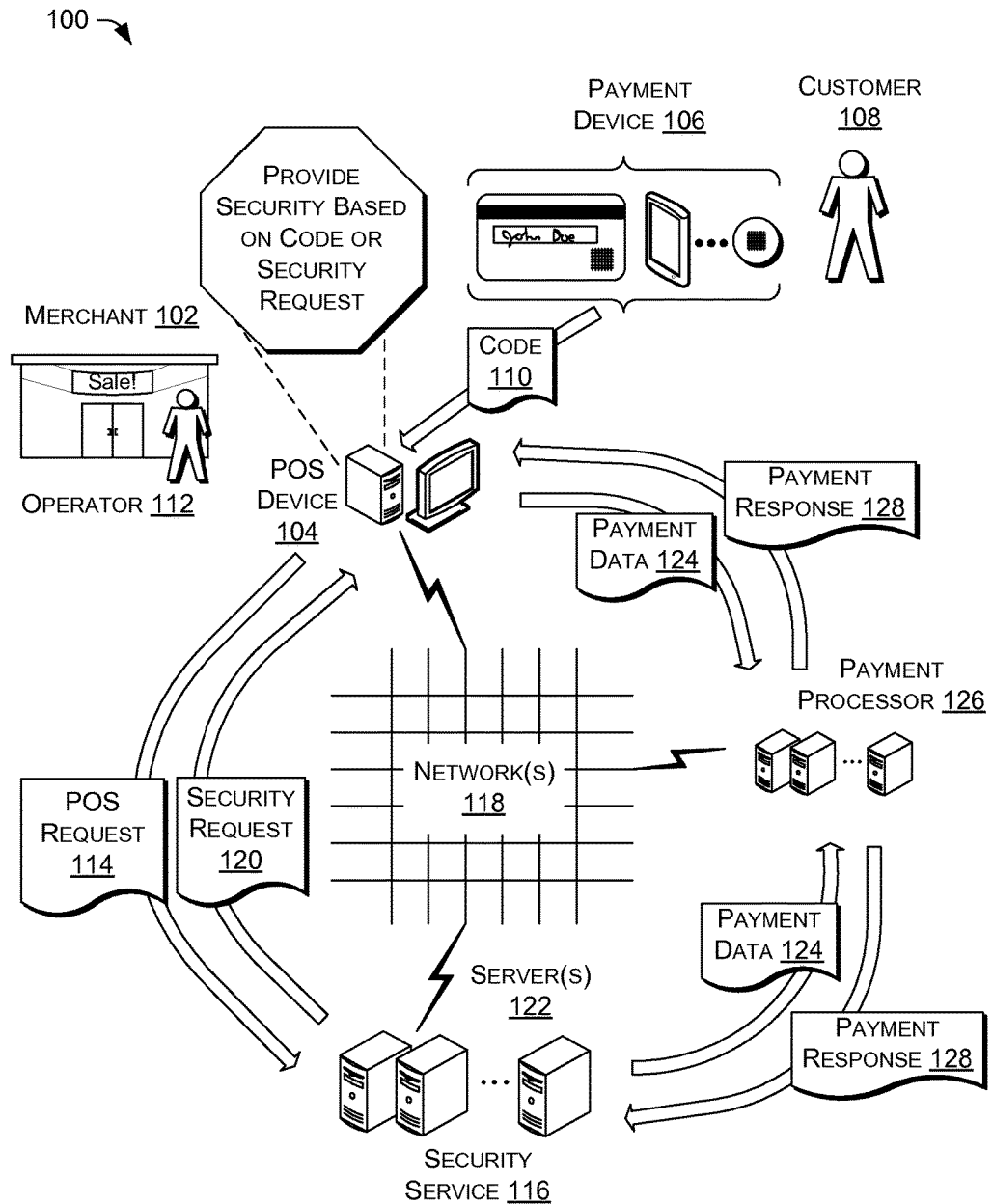
FIG. 1 is a schematic diagram of an illustrative environment usable to process payments while implementing payment device security.

This disclosure is directed, in part, to providing payment device security by storing security information in a payment device that, when received by a point-of-sale (POS) device, initiates a security request by the POS device that is used to protect the payment device against fraudulent use or misuse by unauthorized people. In some embodiments, the payment device may be a credit card or other type of payment card (e.g., debit card, gift card, etc.) that includes security information, that when read by a POS device, causes the POS to prompt an operator to perform a specified security request such as check the customer identification to make sure the identification corresponds to the payment device (e.g., same person, same signatures, etc.).

In accordance with some embodiments, the payment device may store a code that, when received by the POS device, may allow the POS device to determine a security request associated with the code. The code may be an account identifier associated with the payment device (e.g., credit card number, etc.) or the code may be different information that is read by the POS device along with the account identifier. The POS device may determine the security request by converting the code locally or the POS device may transit the code to a security provider that returns the security request. The POS device may then implement and/or enforce the security request. In some embodiments, the authorized user of the payment device may specify at least part of the security request, thereby enabling customization the security request.

In some embodiments, the POS device may select from two or more types of security requests to perform based in part on capabilities of the POS device. For example, when the POS devices is a self-checkout device, the POS device is unable to rely on a human operator to perform security tasks (e.g., check user identification (ID), verify the customer looks like an image associated with the payment device, etc.). The POS device may then select another security request that the POS is capable of performing based on a type or use of the POS device (e.g., request a PIN from the customer, etc.).

In various embodiments, the POS device may obtain an image of the customer. The POS device may also obtain an image of the authorized user(s) of the payment device, which may be obtained from the code provided by the payment device. The POS device may then compare the image of the customer to the image of the authorized user of the payment card, using digital image comparison algorithms, to determine whether the customer is a same person as the authorized user of the payment device. When the comparison determines that the customer and authorized user's images are dissimilar, than the POS device may reject the payment device. In some instances, the POS may rely on third party image processing to accomplish a comparison of the image of the customer to the image of the authorized user of the payment device.

The techniques and systems described herein may be implemented in a number of ways. Example implementations are provided below with reference to the following figures.

Illustrative Environment

FIG. 1 is a schematic diagram of an illustrative environment 100 usable to process payments while implementing payment device security. The environment 100 may include a merchant 102 that includes a point-of-sale (POS) device 104. The POS device 104 may process a payment device 106 provided by customer 108 during a transaction. The payment device 106 may be a payment card (e.g., a credit card, a debit card, a stored value card, a gift card, etc.), a mobile device that provides electronic payments, a fob, and/or other types of devices that enable the POS device 104 to receive payment information (e.g., a payment account identifier, etc.).

In accordance with various embodiments, the POS device 104 may receive a code 110 from the payment device 106. For example, the POS device 104 may receive the code 110 by reading the code 110 from a magnetic stripe, reading the code 110 from an image, receiving the code 110 from an radio frequency identifier (RFID), receiving the code 110 from a near field communication (NFC), receiving the code 110 from a wireless signal, scanning the code 110 from an image, and/or receiving the code 110 using other techniques. Moreover, the POS device 104 and the payment device 106 may support acoustic-based data transfer. For example, the payment device 106 may include software components and a speaker that enable the payment device 106 to broadcast data to the POS device 104 as sound waves, while the POS device 104 may include software components and microphone that enable the second mobile device to receive the data embedded in the sound waves. Thus, one or more of radio signal-based data transfer (e.g., NFC or Bluetooth®), light-based data transfer (e.g., reading the code 110 from an image or infrared data transfer), an acoustic-based data transfer (e.g., sound wave-embedded data), or magnetic field-based transfer (e.g., reading the code 110 from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein.

The code 110 may be an account identifier associated with the payment device 106 (e.g., credit card number, etc.) or the code 110 may be different information that is read by the POS device 104 along with the account identifier. The code 110 is associated to a security request to be performed by the POS device 104.

In accordance with some embodiments, the POS device 104 may read the code 110 and then perform a security request (or a portion of the security request) based on the code 110. For example, the code 110 may, after being read by the POS device 104, indicate that the POS device 104 is to instruct an operator 112 to check the customer's identification (ID) to determine whether the payment device 106 is associated with the customer 108 (and not belonging to another person, etc.). The code may also include other information, such as an image of the authorized user of the payment device 106, a secret question and answer, and/or other security information that can be processed and fulfilled by the POS device 104.

In some embodiments, the POS device 104 may transmit a POS request 114 to a security service 116 via a network 118 to determine a security request 120 to apply for the payment device 106. One or more servers 122 associated with the security service 116 may receive the POS request 114 and determine the security request 120 based at least in part of information in the POS request 114. For example, the POS request 114 may include the code 110. The servers 122 may determine the security request 120 based in part on the code 110. For example, the authorized user of the payment device 106 may register the payment device 106 with the security service 116. During the registration, the authorized user of the payment device 106 may specify security preferences to be implemented by a POS device that performs a transaction with the payment device 106. The servers 122 may determine the security preferences and then transmit the security request 120 to the POS device 104. In some instances, the servers 122 may select the security request from multiple security requests based on a random selection, capabilities of the POS device 104 (e.g., self checkout device, etc.), and/or other factors. The security request 120 is based on the specified security preferences. For example, the authorized user of the payment device 106 may request that the POS device 104 prompt the customer 108 (who may or may not be the authorized user of the payment device 106) to enter security information (e.g., a password, etc.), show additional identification, answer a secret question, and/or perform other actions. In some embodiments, the customer 108 may input data that is transmitted, by the POS device 104, to the servers 122 for verification (e.g., as an additional instance of the POS request 114). In such instances, an additional instance of the security request 120 may provide a confirmation or rejection of the verification.

In response to passage or verification of a security request (e.g., the customer's identity is confirmed, etc.), the POS device 104 may process a payment with the payment device 106. The POS device 104 may transmit payment data 124 to a payment processor 126. In response, the payment processor 126 may transmit a payment response 128 to the POS device 104 to confirm payment and/or for other reasons. In some embodiments, the POS device 104 may communicate with the payment processor 126 through the security service 116. Thus, the security service 116 may receive the payment data from the POS device 104, perform the aforementioned security process, and in response to passage of the security, forward the payment data 124 to the payment processor 126. The payment processor 126 may then provide the payment response 128 to the security service 116, which may relay the payment response 128 back to the POS device 104. In some embodiments, the security device 116 may be a same entity as the payment processor 126, and therefore the operations of both the security service 116 and the payment processor 126 may be performed by the same entity. In various embodiments, the security service 116 may provide various services for the merchant 102, such as process payments (as discussed above), process shipments, manage inventory, and/or perform other operations or services for the merchant 102. In response to the customer failing to satisfy the security request, the POS device 104 may reject the payment device 106 prior to processing a payment.

The environment 100 provides a general framework of possible communications between the payment device 106, the POS device 104, the security service 116, and the payment processor 126, but is not exhaustive. Some of the computing devices included in the environment 100 are described in greater detail below.

Figure 2A:
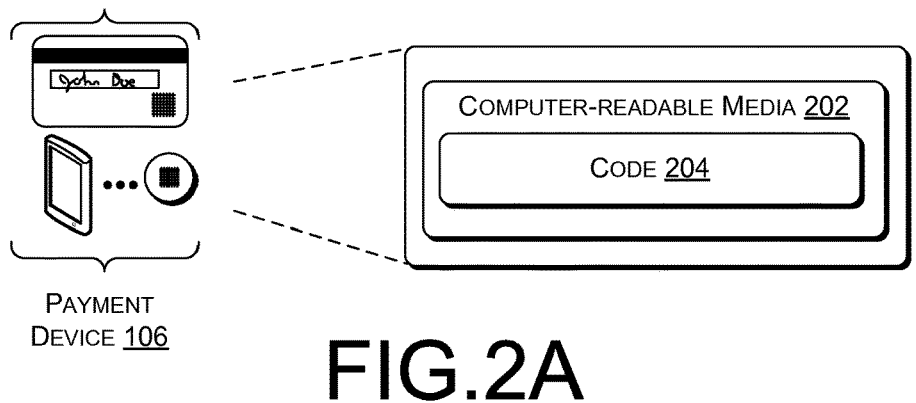
FIGS. 2A, 2B, and 2C are block diagrams of illustrative computing architecture of various devices included in the environment of FIG. 1.
Figure 2B:
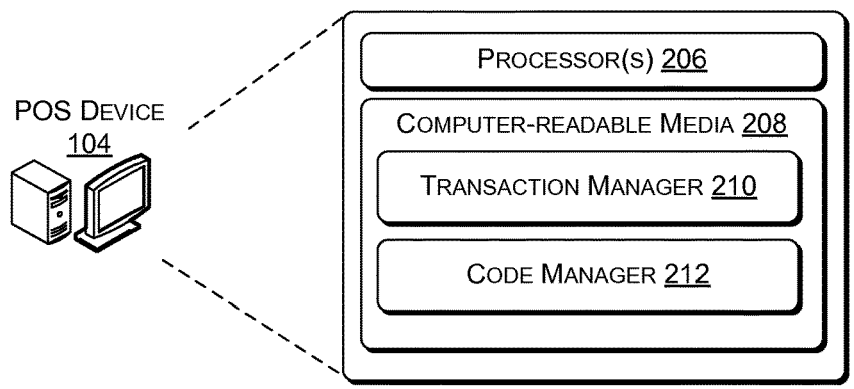
Figure 2C:
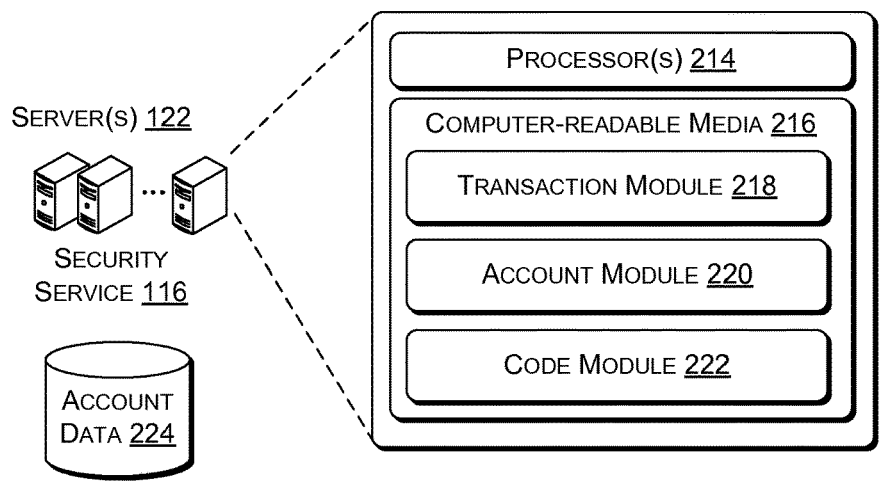

FIGS. 2A, 2B, and 2C are block diagrams of illustrative computing architecture of various devices included in the environment of FIG. 1.

FIG. 2A shows an illustrative computing architecture of the payment device 106 associated with the customer 108. The architecture may include computer-readable media 202. The computer-readable media 202 may store various modules, applications, programs, or other data. The computer-readable media 202 may store the code 110. The code 110 may be the same as or different than an account identifier associated with the payment device 106.

FIG. 2B shows illustrative computing architecture of the POS device 104. The architecture may include processor(s) 206 and computer-readable media 208. The computer-readable media 208 may store various modules, applications, programs, or other data. The computer-readable media 208 may include instructions that, when executed by the processor(s) 206, cause the processor(s) to perform the operations described herein for the POS device 104. In some embodiments, the computer-readable media 208 may store a transaction manager 210 and a code manager 212, each described in turn.

The transaction manager 210 may perform the core operations of the POS device 104, such as receive item or service information, determine an amount due, collect or process a payment, store transaction records, generate receipts, initiate shipments, and so forth. In some embodiments, the transaction manager 210 may be hosted by another service, such as the security service 116. In these instances, the transaction module 210 may perform a subset of functions while a corresponding application run by the servers 112 may perform another subset of the functions, as discussed below.

The code manager 212 may read the code 110 from the payment device 106. As discussed above, the code 110 may be the same as or different than an account identifier associated with the payment device 106. In some embodiments, the code manager 212 may associate the code 110 with a security request for the payment device 106. For example, part of the account identifier may indicate the code, which in turn may indicate the security request, such as to check the customer's ID. In various embodiments, the code manager 212 may use the code 110 to search a lookup table to determine the security request for the particular payment device 106. The security request may be established by the authorized user of the payment device 106. In some embodiments, the code manager 212 may interact with the security service 116 to process to code 110, as discussed below.

FIG. 2C shows illustrative computing architecture of the servers 122. The architecture may include processor(s) 214 and computer-readable media 216. The computer-readable media 216 may store various modules, applications, programs, or other data. The computer-readable media 216 may include instructions that, when executed by the processor(s) 214, cause the processor(s) to perform the operations described herein for the servers 122. In some embodiments, the computer-readable media 216 may store a transaction module 218, an account module 220, and a code module 222, each described in turn.

The transaction module 218 may interact with the transaction manager 210 to provide transaction services to the POS device 104. For example, the transaction module 218 may perform some or portions of some or all of the transaction functions, such as determine an amount due, process a payment, store transaction records, generate receipts, initiate shipments, and so forth.

The account module 220 may store and maintain account data 224, such as merchant accounts, customer accounts, and/or other types of accounts. In some embodiments, the account data 224 may store security preferences for a merchant, for authorized users of payment devices (e.g., the payment device 106), and/or other information. For example, an authorized user of the payment device 106 may register with the security service 116 and select security requests/preferences, which are implemented by merchants that use the security service 116 as discussed herein. The authorized user may also rank the preferences and/or provide other rules associated with the security preferences. In some embodiments, the account module 220 may have various security preferences that the authorized user can select. For example, the authorized user may select to have the security request include a check of the authorized user's ID when the authorized user uses the payment device 106. The authorized user may select to have images compared by a self-checkout device, and so forth.

The code module 222 may receive the code from the code manager 212 and then determine the security request, possibly based on data in the account data 224. For example, the code module 222 may receive the code 110, and then perform a lookup in a lookup table to determine a security request associated with the code 110. The code module 222 may then transmit the security request back to the code manager 212 or other component of the POS device 104 that can then implement the security request.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by Internet download. Thus, the computer-readable media used by the POS device 104, the payment device 106 and/or the servers 122 may be implemented as the computer program product as described above.

Illustrative Operations

FIGS. 3, 4, 5, and 7 show various processes to provide payment device security. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
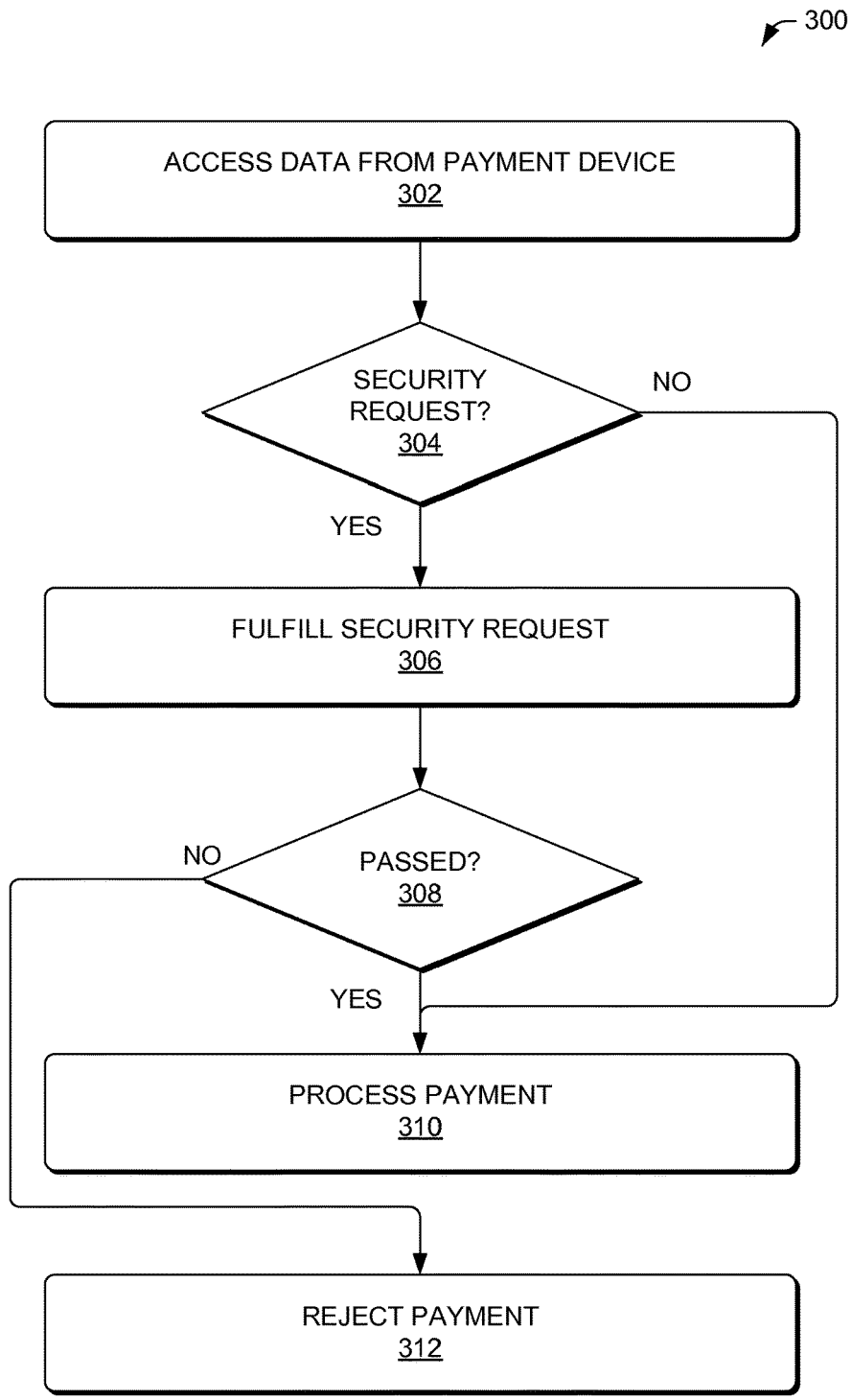
FIG. 3 is a flow diagram of an illustrative process to implement a security request associated with a payment device.

FIG. 3 is a flow diagram of an illustrative process 300 to implement a security request associated with a payment device. The process 300 may be implemented using the environment 100 or the process may be implemented in other environments. The process 300 may be performed in part by the POS device 104. However, in some embodiments, the servers 122 may perform some of the operations described in the process 300.

At 302, the POS device 104 may access data from the payment device 106 using any of the mechanisms described with reference to FIG. 1. For example, the POS device 104 may read a magnetic stripe on a credit card, receive data from an RFID device on the payment device 106, read an image code from the payment device 106, receive a NFC communication from the payment device 106, and/or receive data from other data transmission techniques. The data may include the code 110, which may be the account identifier or data other than the account identifier. The account identifier may also be included in the data when the account identifier is different than the code 110.

At 304, the POS device 104 may determine whether the data includes a request for security. For example, the POS device 104 may determine whether the payment device includes the code 110. The POS device 104 may use the code 110 to determine whether the payment device 106 has an associated security request. When the security request is present (following the "yes" route from the decision operation 304), then the process 300 may advance to an operation 306.

At 306, the POS device may fulfill the security request. For example, the POS device 104 may instruct a human operator (e.g., a cashier, etc.) to verify information (e.g., check the customer's ID to verify an association between the payment device 106, the ID, and an appearance of the customer, etc.) and/or perform other tasks, such as ask for a secret password, phrase, answer to a question, request or access biometric information, determine location information, etc.

In some embodiments, the POS device 104 may fulfill the security request without intervention by a human operator. For example, the POS device 104 may compare an image of the authorized user (e.g., owner(s)) of the payment device, which may be embedded in the code 110 or accessibly by the code 110, to an image of the customer using the payment device 106, which may be captured by the POS device 104. The POS device 104 may also include a user interface that allows the customer to enter information, such as an answer to a secret question, a password, a phrase, etc. The code 110 may include an answer to the secret question or the answer may be retrieved using the code 110 (e.g., from the POS device 104 or the security service 116).

In some embodiments, the POS device 104 may obtain biometric information from the customer 108 and compare the biometric information to biometric information associated with the authorized user. For example, the POS device 104 may obtain a fingerprint, a retinal scan, a facial scan, and/or other biometrics to create biometric information.

In various embodiments, the security request may include location information. The location information may be used to compare a user location of the authorized user of the payment device to a merchant location associated with the merchant 102 that processes the payment card to determine whether the authorized user is the customer (or at least present at the merchant location). The user location may be determined using a global positioning system, a radio frequency identifier associated with the authorized user (e.g., a Wi-Fi connection, an RFID, etc.), a unique property associated with the merchant 102 (e.g., prompting the customer 108 to enter, via the payment device 106, the color of the merchant-clerk's shirt or an identification of a unique item disposed near the POS device 104), or other location information, such as using network positioning services or facilities. For example, the security service 116 and/or the payment processor 126 may query a cellular data carrier to provide positioning information for the payment device 106 based on time-difference-of-arrival data to several cellular radio sites. The location determination may also be based on receiving information from data networks or third-party providers which associate a particular network address to a particular location. For example, the internet protocol address of 206.33.56.105, a media access control address 04:00:12:03:11:A1 of a wireless access point, or both may be associated with a particular street address. In some embodiments, the location information may be used in conjunction with another security request.

At a decision operation 308, the POS device 104 may determine whether the security request was fulfilled, such as by receipt of a correct response, matching visual features of the customer to an image of the payment device authorized user, and/or other verifications. When the POS device 104 determines that the security request is passed (following the "yes" route from the decision operation 308), then the process 300 may advance to an operation 310.

At 310, following the "yes" route from the decision operation 308 or following the "no" route from the decision operation 304, the POS device may process the payment using the payment device 106.

At 312, following the "no" route from the decision operation 308, the POS device 104 may reject the payment and/or the payment device 106.

Figure 4:
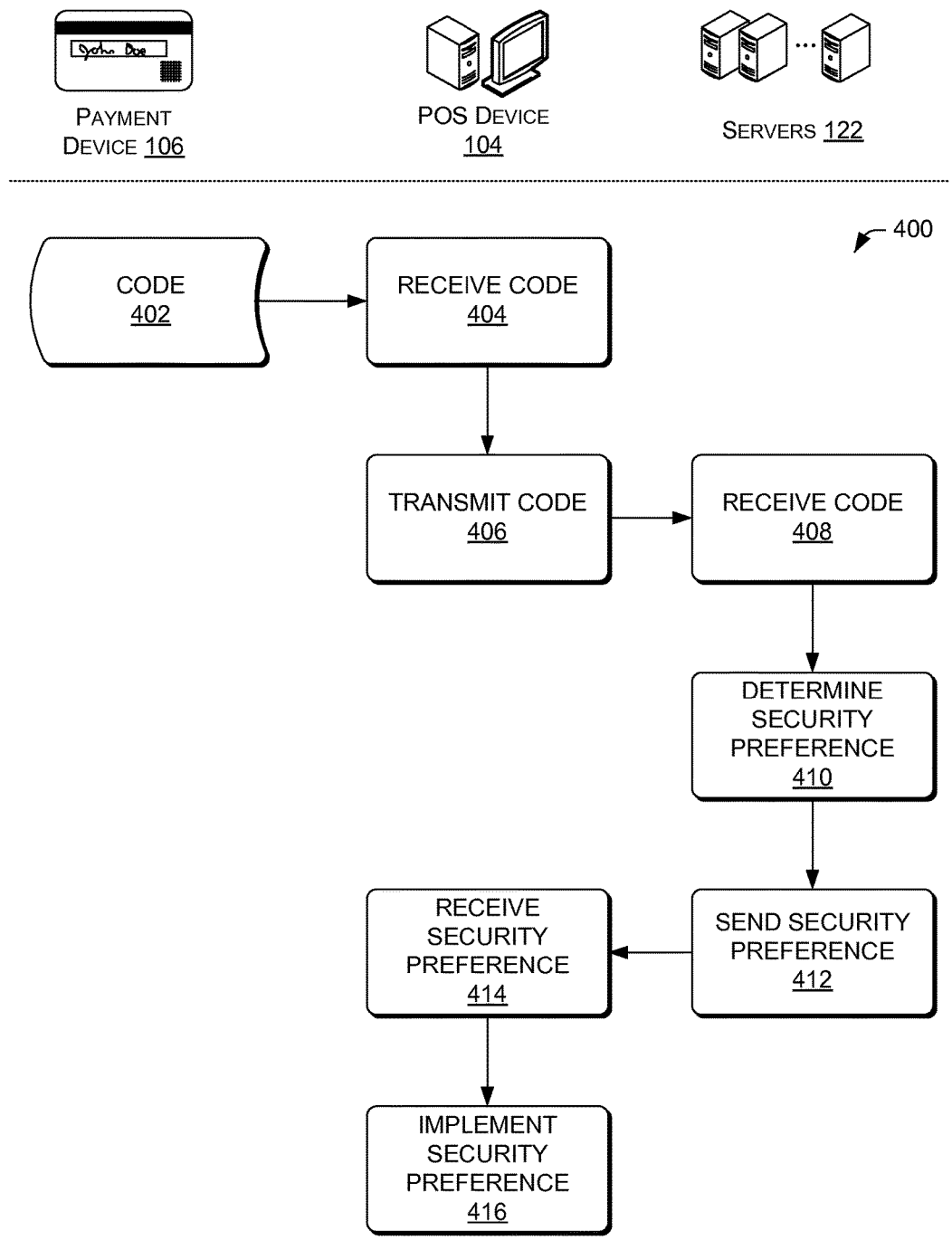
FIG. 4 is a flow diagram of an illustrative process to access security preferences associated with a payment device from a security service.

FIG. 4 is a flow diagram of an illustrative process 400 to access security preferences associated with a payment device from the security service 116. The process 400 includes operations organized under devices that may perform the respective operations. However, other devices may perform some of the operations. Thus, the process 400 is not limited to the being performed by the devices shown in FIG. 4. The process 400 may be implemented using the environment 100 or the process may be implemented in other environments.

At 402, the payment device 106 may provide stored data to the POS device 104. The POS device 104 may receive or read the code 110 at 404. The operation 404 may performed in a same or similar manner as the operation 302 described with reference to FIG. 3.

At 406, the POS device 104 may transmit the code 110 to the servers 122 of the security service 116. The servers 122 may receive the code at 408.

At 410, the servers 122 may determine a security preference 410 based at least in part on the code 110. The security preference is the security request to be performed to the customer and/or by the POS device 104. The servers 122 may determine the security preference by accessing the account data 124 that includes preferences of the authorized user of the payment device 106. For example, the servers 122 may access the preferences from a lookup table using the code 110. In some embodiments, the servers 122 may select the security request from multiple security request based on factors such as capabilities of the POS device 104, user preference, random selection, and/or other factors.

At 412, the servers 122 may transmit the security preference to the POS device 104. The POS device 104 may receive the security preference at 414.

At 416, the POS device may implement the security preference as the security request. The operation 416 may performed in a same or similar manner as the operation 306 described with reference to FIG. 3.

Figure 5:
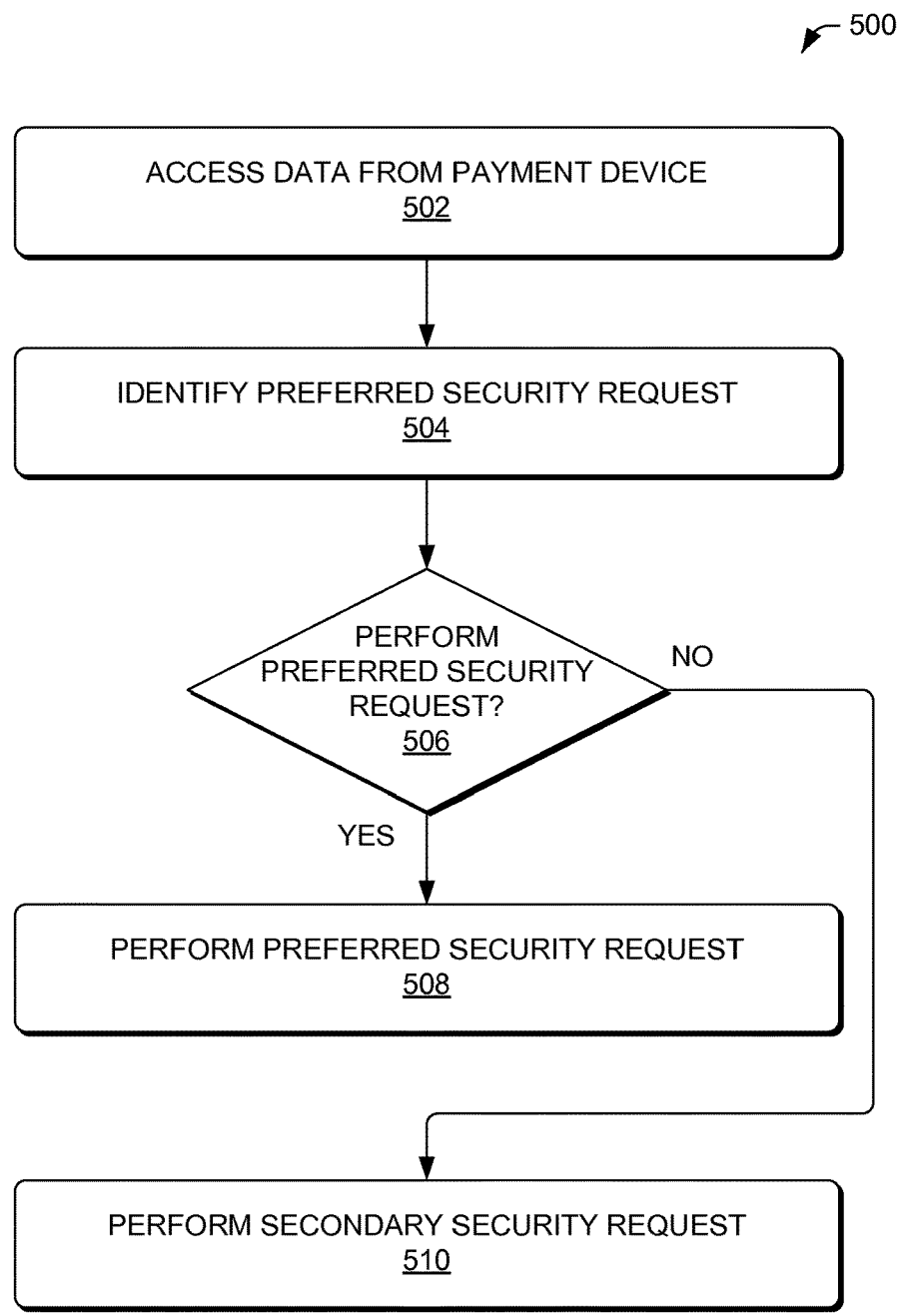
FIG. 5 is a flow diagram of an illustrative process to select a security preference to be performed by a point-of-sale device.

FIG. 5 is a flow diagram of an illustrative process 500 to select a security preference to be performed by a point-of-sale device. For example, a self-checkout POS device may have limited capabilities and may be unable to perform some security requests/preferences (e.g., may have no human operator to check a customer ID, etc.). The process 500 may be implemented using the environment 100 or the process may be implemented in other environments.

At 502, the POS device 104 may access data from the payment device 106 using any of the mechanisms described with reference to FIG. 1. For example, the POS device 104 may read a magnetic stripe on a credit card, receive data from an RFID device on the payment device 106, read an image code from the payment device 106, receive a NFC communication from the payment device 106, and/or receive data from other data transmission techniques. The data may include the code 110, which may be the account identifier or data other than the account identifier. The account identifier may also be included in the data when the account identifier is different than the code 110.

At 504, the POS device may identify a preferred security request to be performed by the POS device 104 to verify proper use of the payment device 106. However, the preferred security request may include operations that the POS device 104 is unable to perform. For example, when the POS device 104 is a self-checkout terminal at a gas station or other location, the POS device 104 may include limited hardware, such as a keypad, a camera, and a display and/or limited software to leverage existing hardware. In contrast, when the POS device 104 is a full service checkout POS terminal operated by a human operator, the POS device 104 may include other hardware, software, and a human operator to perform some tasks included in a security request (e.g., check a customer's ID, etc.).

At 506, the POS device 104 may determine whether the POS device 104 is to perform the preferred security request. As discussed above, the POS device 104 may not have hardware, software, and/or a human operator, some of which may be necessary to perform the preferred security request. When the POS device 104 is able to perform the preferred security request (following the "yes" route from the decision operation 506), then the POS device 104 may perform the preferred security request at an operation 508. When the POS device is unable to perform the preferred security request (following the "no" route from the decision operation 506), then the process 500 may advance to an operation 510.

At 510, the POS device 104 may perform a secondary security request. The secondary security request may be selected based in part on hardware/software capabilities of the POS device 104 and/or a presence or absence of a human operator. In some embodiments, the process 500 may loop through each of a ranked set of security preferences/requests until the POS device 104 identifies a security request that the POS device 104 is capable of implementing.

Illustrative Image Comparison

Figure 6:
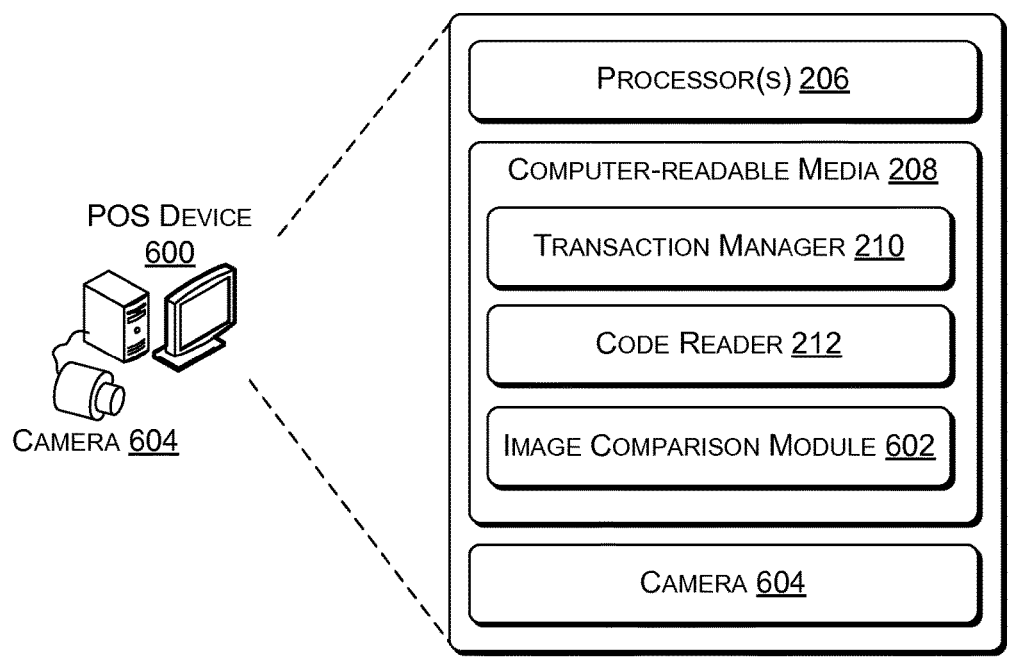
FIG. 6 is a block diagram of illustrative computing architecture of a point-of-sale device that performs image comparisons.

FIG. 6 is a block diagram of illustrative computing architecture of an illustrative POS device 600 that performs image comparisons. The POS device 600 may include some or all of the hardware and software described with reference to the POS device 104 shown in FIG. 2B. In some embodiments, the POS device 600 may be a self-checkout terminal that does not have a human operator other than the customer (e.g., no merchant employee/cashier operating the POS device 600). Instead, the POS device 600 may interact with the customer to perform a transaction. The POS device 600 may be implemented in various scenarios, such as at a gas station, a supermarket, an automated teller machine (ATM), and other locations were self-checkout is feasible and convenient.

The architecture may include the processor(s) 206 and the computer-readable media 208. The computer-readable media 208 may include instructions that, when executed by the processor(s) 206, cause the processor(s) to perform the operations described herein for the POS device 600. In some embodiments, the computer-readable media 208 may store an image comparison module 602. Although the image comparison module 602 is shown as residing on the POS device 104, the image comparison module 602 may also reside on the servers 122 and be accessible by the POS device 104 via the servers 122.

The image comparison module 602 may compare imagery captured, recorded, or detected from a camera 604 to imagery of the authorized user of the payment device 106. The imagery of the authorized user of the payment device 106 may be included in the code 110 or may be retrieved from storage using the code 110. For example, the security service 116 may store an image of the authorized user of the payment device 106 in the account data 124 or the merchant 102 may store the image of the authorized user of the payment device 106 locally for access by the POS device 104. The camera 604 may be an integrated camera (e.g., integrated with the POS device 104), directly connected to the POS device 104 (e.g., via a cable, etc.), or connected via a network such as the network 118. For example, the camera 604 may be a surveillance camera used by the merchant 102 for other purposes as well as by the POS device 104 under direction of the image comparison module 602. The camera 604 may be a video camera or a still image camera.

In accordance with some embodiments, the image comparison module 602 may compare the image of the authorized user of the payment device 106 to the image from the camera 604. The image comparison module 602 may compare features of the images to determine whether the authorized user of the payment device 106 is a same person as the customer 108. For example, the image comparison module 602 may employ image comparison algorithms, such as scale-invariant feature transformation (SIFT) that can detect and describe features in different images and then compare the features across multiple images to determine a likelihood that the images include the same features, and thus the same person. The operation of the image comparison module 602 is further described below with reference to FIG. 7.

Figure 7:
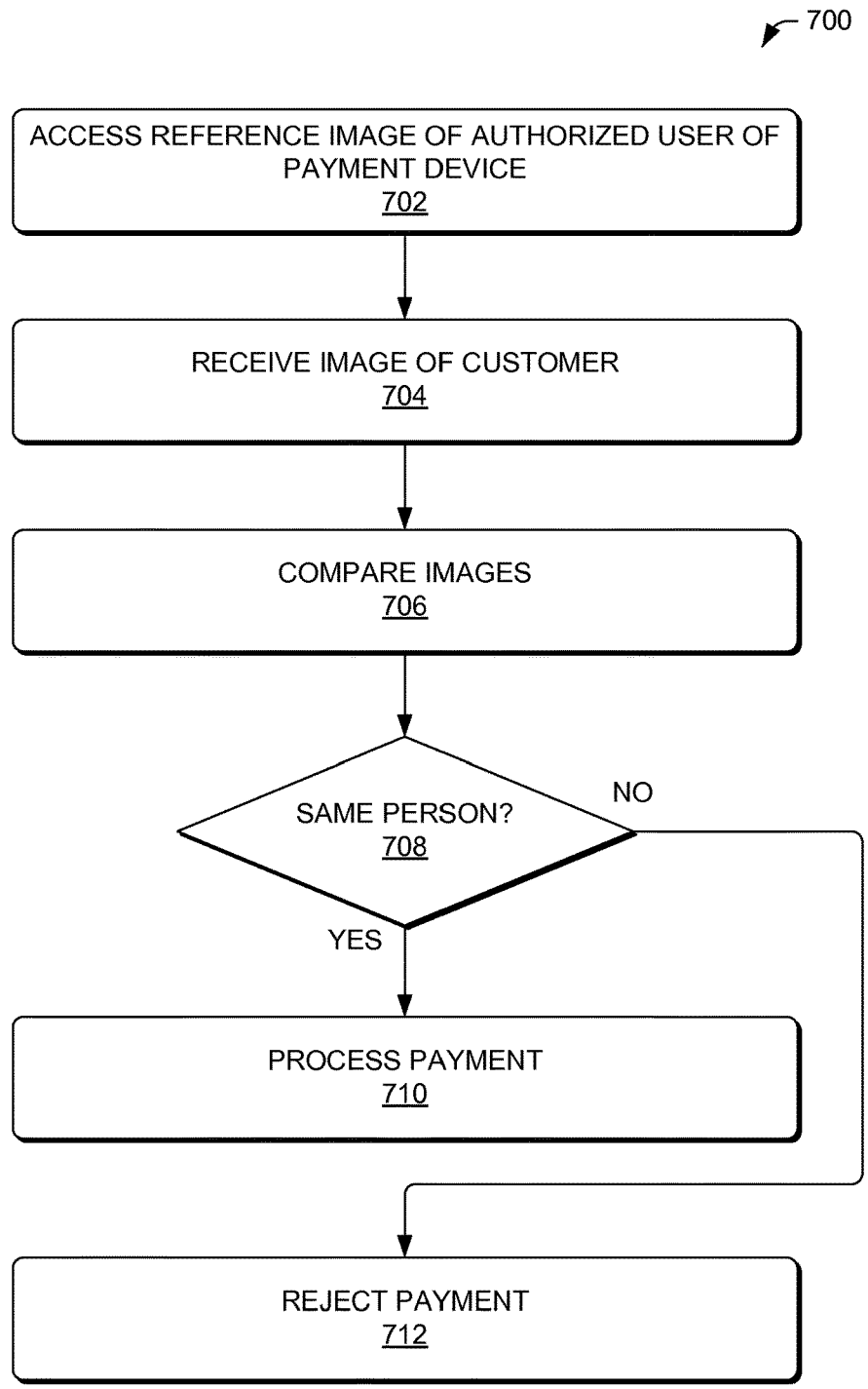
FIG. 7 is a flow diagram of an illustrative process to perform an image comparison to verify that a customer is an authorized user of a payment device.

FIG. 7 is a flow diagram of an illustrative process 700 to perform an image comparison to verify that a customer is an authorized user of a payment device. The process 700 may be implemented using the environment 100 and the POS device 600 or the process may be implemented in other environments. In some embodiments, the security service 116 may perform some of the operations of the process 700.

At 702, the POS device 600 may access an image of the authorized user(s) of the payment device 106. For example, the image of the authorized user may be received from the payment device 106 via the code 110 (e.g., embedded in read-only memory such as a magnetic strip, etc.), received from the security service 116 using the code 110, or received from local storage using the code 110 (stored in storage location local to the POS device 600). In some embodiments, when multiple people share the payment device, the payment device may be associated with images of multiple different people.

At 704, the POS device 600 may receive or capture an image of the customer using the camera 604. For example, the POS device 600 may receive images of the customer from a surveillance camera or another camera, such as a camera that is configured for a dedicated purpose of obtaining images of the customer during a transaction.

At 706, the image comparison module 602 may compare the image of the authorized user from the operation 702 to the image of the customer from the operation 704 to determine whether the customer is the authorized user of the payment device (or otherwise an authorized user of the payment device). In some embodiments, a payment device may have multiple authorized users, and thus multiple images associated with the payment device. The image comparison module 602 may determine whether the image of the customer from the operation matches any images associated with the authorized user(s) obtained at the operation 702. The image comparison module 602 may use one or more image comparison algorithms. For example, the image comparison module 602 may compare features of the images to determine a likelihood that the authorized user of the payment device 106 is a same person as the customer 108. For example, the image comparison module 602 may employ scale-invariant feature transformation (SIFT) that can detect and describe features in different images and then compare the features across multiple images to determine a likelihood that the images include the same features, and thus the same person. In various embodiments, the comparison may include use of a threshold confidence level, that when reached or exceeded, indicates that the images feature the same person. In some embodiments, the image comparison module 602 may present both images (images from the operations 702 and 704) to a human operator and let the human operator determine whether the images are of the same person. The human operator may or may not be an operator of the POS device 600.

At 708, the POS device 600 (or possibly the servers 122) may determine whether the images from the operations 702 and 704 feature the same person based on the comparison at the operation 706 (e.g., based on an output of an algorithm, based on an input received from a human operator, etc.). In some embodiments, the POS device 600 may determine if any images from the operation 702 include the same person as shown in the image from the operation 704, based on the comparing at the operation 706, when multiple are authorized to use the payment device 106.

When the images feature the same person, such as when the comparing reaches or exceeds the threshold confidence level (following the "yes" route from the decision operation 708), then the process 700 may advance to an operation 710 and process the payment.

When the images do not feature the same person, such as when the comparing is below the threshold confidence level (following the "no" route from the decision operation 708), then the process 700 may advance to an operation 712 and reject the payment or the payment device 106.

In some embodiments, the comparing of the images of the operation 706 may be performed, at least in part, by a remote server, such as by the security service 116. Thus, the POS device 600 may transmit information to the security service 116 to enable the security service to perform the comparison. The security service 116 may transmit a response back to the POS device 600, which may indicate that the customer is a same person or a different person as the authorized user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method to verify authorization of a payment card used by a customer, the method comprising:
   accessing, using a point-of-sale (POS) device, a code from the payment card, the code being different than an account number of the payment card;
   identifying multiple security requests based at least in part on the code, individual security requests of the multiple security requests associated with a corresponding different process to verify whether the customer redeeming the payment card is an authorized user of the payment card;
   selecting one of the multiple security requests as a selected security request based least in part on a type of the POS device;
   performing the selected security request to determine whether the customer is the authorized user of the payment card and passes the selected security request or is not the authorized user of the payment card and fails the selected security request, wherein performing the selected security request comprises:
   capturing an image of the customer,
   obtaining, based at least in part on the code, an image of the authorized user of the payment card, and
   electronically comparing the image of the customer to the image of the authorized user, wherein the electronically comparing comprises:
   employing scale-invariant feature transformation (SIFT) to detect first one or more features in the image of the customer,
   employing the SIFT to detect second one or more features in the image of the authorized user,
   compare the first one or more features detected in the image of the customer with the second one or more features detected in the image of the authorized user,
   based at least in part in comparing the first one or more features with the second one or more features, determine a likelihood that the image of the customer and the image of the authorized user include one or more similar features; and
   rejecting the payment card, prior to processing a payment, in response to electronically comparing the image of the customer to the image of the authorized user and determining that the image of the customer shows a different person than the image of the authorized user.

2. The method as recited in claim 1, wherein the POS device is a self checkout device, and wherein obtaining the image of the authorized user of the payment card comprises:
   obtaining the image of the authorized user of the payment card from a storage included in a security server.

3. The method as recited in claim 1, further comprising analyzing the image of the customer and the image of the authorized user using a feature analysis algorithm, and wherein the comparing includes comparing features in the image of the customer to features in the image of the authorized user to determine whether an amount of common features reaches or exceeds a threshold confidence level indicating that the image of the customer shows a same person as the image of the authorized user.

4. A computer-implemented method comprising:
   determining a security request based at least in part on a code obtained from a payment device, the security request to initiate a comparison of an identity of a customer to an identity of an authorized user of the payment device, wherein the identity of the authorized user comprises an image of the authorized user that is stored in a storage included in a security server that is remote from and that is accessible by a point-of-sale (POS) device;
   capturing an image of the customer;
   based at least in part on the code obtained from the payment device, accessing, by the POS device, the image of the authorized user of the payment device from the storage;
   implementing the security request by initiating, without input from a human operator of the POS device, an image analysis to electronically determine whether the image of the authorized user of the payment device accessed from the storage includes a same person as the image of the customer captured after presentation of the payment device to pass the security request, wherein initiating the image analysis includes:
   detecting one or more first features in the image of the customer;
   detecting one or more second features in the image of the authorized user; and
   comparing, using a feature analysis algorithm, the one or more first features with the one or more second features to determine a likelihood that the image of the customer and the image of the authorized user include one or more similar features;

determining that the security request failed based at least in part on comparing the one or more first features with the one or more second features; and rejecting the payment device, prior to processing a payment, in response to the security request having failed.

5. The method as recited in claim 4, further comprising wherein the payment device is a payment card and wherein the code is stored on at least one of an image code or a magnetic stripe.

6. The method as recited in claim 4, further comprising performing the image analysis, and further comprising analyzing the image of the customer and the image of the authorized user based at least in part by use of the feature analysis algorithm.

7. The method as recited in claim 6, wherein the comparing includes comparing features in the image of the customer to features in the image of the authorized user to determine whether an amount of common features reaches or exceeds a threshold confidence level.

8. The method as recited in claim 6, wherein the feature analysis algorithm is a scale-invariant feature transformation (SIFT) algorithm.

9. The method as recited in claim 4, wherein the implementing the security request is performed by performing the image analysis, and wherein capturing the image of the customer further comprises capturing the image of the customer using a surveillance camera.

10. The method as recited in claim 4, wherein the implementing the security request is performed by performing the image analysis, and further comprising receiving the image of the authorized user of the payment device from an entity that maintains a user account to store the image of the authorized user, the user account accessible by the authorized user.

11. The method as recited in claim 4, further comprising selecting the security request to be performed is based at least in part on whether the human operator is available to verify an identity of the customer.

12. The method as recited in claim 4, wherein the initiating the image analysis includes transmitting a request to a remote server to process the image analysis.

13. One or more non-transitory computer-readable media storing computer-executable instructions that, when executed on one or more processors, performs acts comprising:

accessing, using a point-of-sale (POS) device, a code from a payment device, the code being associated with multiple security requests defined at least in part by an authorized user of the payment device;

identifying at least a portion of the multiple security requests based at least in part on the code, individual security requests of the multiple security requests associated with a corresponding different process to verify whether a customer redeeming the payment device is the authorized user of the payment device;

randomly selecting one of the multiple security requests as a selected security request;

capturing an image of the customer;

obtaining, based at least in part on the code, an image of the authorized user of the payment device;

detecting one or more first features in the image of the customer;

detecting one or more second features in the image of the authorized user;

comparing the one or more first features with the one or more second features; and performing the selected security request to determine whether the customer is the authorized user of the payment device or is not the authorized user of the payment device based at least in part in comparing the one or more first features with the one or more second features.

14. The one or more non-transitory computer-readable media as recited in claim 13, further comprising rejecting the payment device, prior to processing a payment, in response to the customer failing to satisfy the selected security request.

15. The one or more non-transitory computer-readable media as recited in claim 13, wherein the POS device is a self checkout device, and wherein performing the selected security request includes comparing the image of the customer to the image of the authorized user to determine whether the image of the customer shows a different person than the image of the authorized user.

16. The one or more non-transitory computer-readable media as recited in claim 13, wherein the selected security request is a request to check an identification (ID) of the customer, and further comprising prompting, via the POS device, a human operator of the POS device to verify an identity of the customer.

17. The one or more non-transitory computer-readable media as recited in claim 13, wherein the selected security request is a request for the customer to answer a secret question, and further comprising:

prompting, via the POS device, the customer to answer the secret question;

retrieving an answer to the secret question using the code; and determining whether a response by the customer to the secret question is equivalent to the answer to the secret question.

18. The one or more non-transitory computer-readable media as recited in claim 13, wherein the selected security request is a request for biometric information from the user.

19. The one or more non-transitory computer-readable media as recited in claim 13, wherein the selected security request includes a location request to determine a user location of the authorized user of the payment device using at least one of a global positioning system or a radio frequency identifier associated with the authorized user, and wherein performing the selected security request includes comparing the user location to a merchant location associated with a merchant that processes the payment device to determine whether the authorized user passes the selected security request.

20. One or more non-transitory computer-readable media storing computer-executable instructions that, when executed on one or more processors, performs acts comprising:

accessing a code stored on a payment device;

determining a security request based at least in part on the code, the security request to initiate a comparison of an identity of a customer to an identity of an authorized user of the payment device, wherein the identity of the authorized user comprises an image of the authorized user that is stored in a storage included in a security server;

capturing an image of the customer;

based at least in part on the accessed code, accessing the image of the authorized user of the payment device from the storage;

detecting one or more first features in the image of the authorized user;

detecting one or more second features in the image of the customer;

implementing the security request by performing image analysis to electronically compare the one or more first features with the one or more second features; and determining whether the customer is an authorized user of the payment device, based at least in part on an outcome of the implemented security request and based at least in part on comparing the one or more first features with the one or more second features.

21. The one or more non-transitory computer-readable media as recited in claim 20, wherein the acts further comprise rejecting the payment device, prior to processing a payment, in response to the customer failing the security request.

22. The one or more non-transitory computer-readable media as recited in claim 20, wherein the implementing the security request is performed by the performing the image analysis, and wherein the acts further comprise analyzing the image of the customer and the image of the authorized user based at least in part by use of a feature analysis algorithm.

23. The one or more non-transitory computer-readable media as recited in claim 20, wherein the acts further comprise receiving the security request from the authorized user of the payment device prior to the accessing the code.

24. The one or more non-transitory computer-readable media as recited in claim 20, wherein the acts further comprise:

identifying multiple security requests based at least in part on the code, ones of the multiple security requests associated with a different process to verify whether the customer redeeming the payment device is an authorized user of the payment device, wherein determining the security request further comprises randomly selecting the security request from the multiple security requests.

25. The method as recited in claim 1, wherein capturing the image of the customer comprises:

capturing the image of the customer using a camera associated with the POS device.

26. A method of authenticating a customer, the method comprising:

capturing an image of the customer;

based at least in part on information received from the customer, accessing an image of an authorized person from a server;

detecting one or more first features in the image of the customer;

detecting one or more second features in the image of the authorized person;

electronically comparing the one or more first features with the one or more second features; and determining whether the customer passes the authentication based at least in part on the electronically comparing the one or more first features with the one or more second features.

27. The method as recited in claim 26, wherein the customer fails the authentication in response to the electronically comparing determining that the image of the customer shows a different person than the image of the authorized person.

28. The method as recited in claim 26, wherein the customer passes the authentication in response to the electronically comparing determining that the image of the customer and the image of the authorized person shows a same person.

29. The method as recited in claim 26, further comprising analyzing the image of the customer and the image of the authorized person using a feature analysis algorithm, and wherein the electronically comparing includes comparing features in the image of the customer to features in the image of the authorized person to determine whether an amount of common features reaches or exceeds a threshold confidence level indicating that the image of the customer shows a same person as the image of the authorized person.

30. The method as recited in claim 26, wherein the electronically comparing includes comparing features in the image of the customer to features in the image of the authorized person to determine whether an amount of common features reaches or exceeds a threshold confidence level.

31. The method as recited in claim 26, wherein the electronically comparing includes transmitting a request to a remote server to perform the comparing.

32. The method as recited in claim 26, wherein the capturing the image of the customer includes activating a camera to capture the image.

\* \* \* \* \*

UNITED STATES PATENT AND TRADEMARK OFFICE
CERTIFICATE OF CORRECTION

| | | |
|---|---|---|
| PATENT NO. | : 10,475,014 B1 | Page 1 of 1 |
| APPLICATION NO. | : 13/838354 | |
| DATED | : November 12, 2019 | |
| INVENTOR(S) | : Ramalingam | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this
Twentieth Day of December, 2022

Katherine Kelly Vidal
*Director of the United States Patent and Trademark Office*